G. E. NEUBERTH.
CONNECTOR FOR CONDUITS FOR ELECTRIC WIRES.
APPLICATION FILED JAN. 27, 1908.

920,169.

Patented May 4, 1909.

WITNESSES:
S. C. Rogers.
E. A. Peel

INVENTOR
George E. Neuberth.
BY
Wm. H. Caufield
ATTORNEY

UNITED STATES PATENT OFFICE.

GEORGE E. NEUBERTH, OF NEWARK, NEW JERSEY.

CONNECTOR FOR CONDUITS FOR ELECTRIC WIRES.

No. 920,169.      Specification of Letters Patent.      Patented May 4, 1909.

Application filed January 27, 1908. Serial No. 412,728.

*To all whom it may concern:*

Be it known that I, GEORGE E. NEUBERTH, a citizen of the United States, residing at Newark, in the county of Essex and State of New Jersey, have invented certain new and useful Improvements in Connectors for Conduits for Electric Wires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention is designed to provide a coupling for joining the ends of conduits which convey electric wires, and is designed to provide an economical fitting which has a hinged connection on one side of the conduit ends and a detachable fastening on the other side.

The invention is further designed to be made up of sheet metal and to envelop the conduit ends and grip them by means of its frictional contact.

A further object of the invention is to furnish a coupling that has a covering element or lip on each side to cover the space that might be left between the two members of the coupling so that the space, if any, between the conduit ends, is not in danger of contact with an outside element to allow it to touch the wire in the conduit in any way.

The invention is illustrated in the accompanying drawing, in which—

Figure 1:
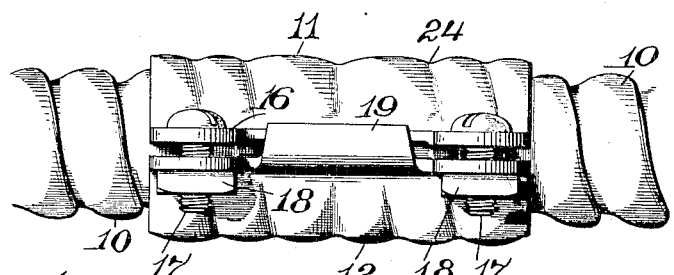
Figure 2:
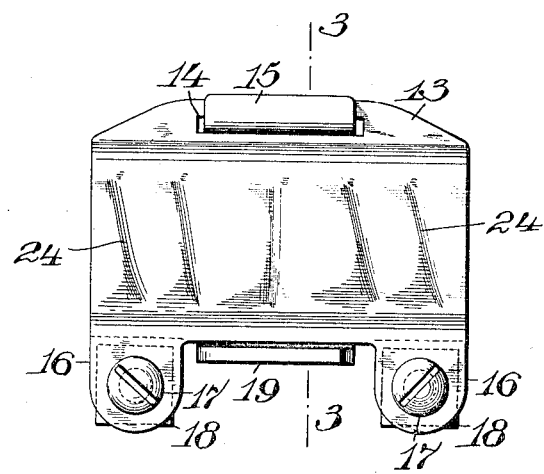
Figure 3:
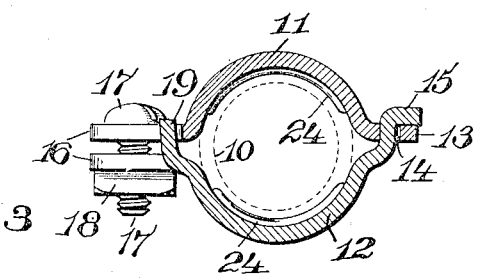

Figure 1 is a side view of a pair of conduit ends with the coupling attached. Fig. 2 is a top view of the coupling, and Fig. 3 is a section on line 3, 3, in Fig. 2.

The coupling is designed to connect conduit ends 10 so that they are held against separation, and also against accidental contact that will permit anything penetrating to the wires in the conduits which might be open to contact on account of the conduit ends having a ragged or rough finish. The coupling consists of a pair of members 11 and 12, which are preferably struck up from sheet metal, although they might be cast. These members are separably hinged together on one side and preferably as shown in Figs. 1, 2 and 3, in which case the member 11 has a lip 13 which is slotted as at 14, and the member 12 has a nose 15, preferably S-shaped, which fits in the slot 14 and bears on the upper side of the lip 13. On the other side the members have opposed wings 16 through which pass the screws or bolts 17 which are fastened by the nuts 18. The nuts are set up fairly close to the member 12, as shown in Figs. 2 and 3, and are thus prevented from turning, and the bolts 17 can be tightened up without holding the nuts with a tool. It very often happens that the members can not be brought tight enough together to prevent the entrance of things between them, and this is particularly desired where the conduits come together. To close this slight opening, the hinged connection serves on one side and a lip 19 on one of the members serves to overlap the space and close it against accidental invasion by an outside element.

The conduits are of the usual style, formed with convolutions, and to fit these convolutions the members are provided with the substantially helical-shaped ribs 24 which act to bind in between the convolutions in the conduits and lock the conduits in place.

Having thus described my invention, what I claim is:—

The combination of the ends of two conduits with a coupling consisting of two members, one member having a wide lip extending from one end of the member to the other and having tapered ends, the lip having a slot therein, the second member having a nose to enter the slot in the first member and form a separable hinge, the nose being centrally located with respect to the ends of the member and extending on each side approximately half way between the center and the ends, the nose forming a closure for its side of the coupling for half its length, wings extending from both members at the ends of the side opposed to the hinge, means for securing the wings together, and a lip on the edge of the second member opposed to the nose, said lip extending across the space between the members, said lip being wide enough to extend approximately half way between the center and the ends of the member on each side of the center.

In testimony, that I claim the foregoing, I have hereunto set my hand this 25 day of January 1908.

GEORGE E. NEUBERTH.

Witnesses:
    WM. H. CAMFIELD,
    E. A. PELL.